(12) United States Patent
Ash, Jr. et al.

(10) Patent No.: US 9,813,139 B2
(45) Date of Patent: Nov. 7, 2017

(54) AUTOMATIC RF ANTENNA SWITCHING FOR AN ELECTRONIC COMMUNICATION DEVICE

(71) Applicant: MoJoose, Inc., Aliso Viejo, CA (US)

(72) Inventors: Daniel R. Ash, Jr., Laguna Niguel, CA (US); Daniel R. Ash, Sr., Sacramento, CA (US); Nikolai Maslennikov, Huntington Beach, CA (US); Jeremy Monroe, Ventura, CA (US)

(73) Assignee: MOJOOSE, INC., Aliso Viejo, CA (US)

( * ) Notice: Subject to any disclaimer, the term of this patent is extended or adjusted under 35 U.S.C. 154(b) by 0 days.

(21) Appl. No.: 15/204,993

(22) Filed: Jul. 7, 2016

(65) Prior Publication Data

US 2017/0026091 A1 Jan. 26, 2017

Related U.S. Application Data

(60) Provisional application No. 62/190,296, filed on Jul. 9, 2015.

(51) Int. Cl.
*H04M 1/00* (2006.01)
*H04B 7/08* (2006.01)
(Continued)

(52) U.S. Cl.
CPC .............. *H04B 7/0802* (2013.01); *H04B 1/00* (2013.01); *H04B 7/0602* (2013.01); *H04W 72/0453* (2013.01); *H04W 88/06* (2013.01)

(58) Field of Classification Search
CPC ........ H04B 1/006; H04B 1/44; H04B 1/0057; H04B 1/40; H04B 1/0067; H04B 7/0805;
(Continued)

(56) References Cited

U.S. PATENT DOCUMENTS 7,477,915 B2 1/2009 Leinonen et al.
7,643,848 B2 1/2010 Robinett
(Continued)

FOREIGN PATENT DOCUMENTS

AU 2008200143 A1 2/2008
AU 2008200143 B2 6/2011
(Continued)

OTHER PUBLICATIONS

PCT/US2016/041407, Written Opinion of the International Searching Authority, Oct. 26, 2016, WIPO [4 pgs.].
(Continued)

*Primary Examiner* — Golam Sorowar
(74) *Attorney, Agent, or Firm* — Siritzky Law, PLLC

(57) ABSTRACT

A device includes (a) a plurality of radio frequency (RF) switches, each operable with a plurality of frequency bands; an RF coupling device; and a processor programmed to selectively control operation of the plurality of RF switches based on an uplink signal from an electronic communication device electromagnetically coupled with the RF coupling device. The processor is programmed to selectively control operation of the plurality of RF switches by causing each of the RF switches to lock on a particular frequency band of the plurality of frequency bands corresponding to a frequency of the uplink signal from the electronic communication device.

29 Claims, 2 Drawing Sheets

(51) Int. Cl.
  *H04B 1/00* (2006.01)
  *H04B 7/06* (2006.01)
  *H04W 72/04* (2009.01)
  *H04W 88/06* (2009.01)

(58) Field of Classification Search
  CPC ............ H04B 7/15507; H04B 7/15542; H04B 7/1555; H04B 7/15564; H04B 1/0064; H04B 1/406; H03H 7/465; H03H 9/0566; H03H 9/1085; H03H 9/542; H03H 9/64; H03H 9/725
  See application file for complete search history.

(56) References Cited

U.S. PATENT DOCUMENTS

| | | | |
|---|---|---|---|
| 7,676,243 | B2 | 3/2010 | Leinonen et al. |
| 8,594,584 | B2 | 11/2013 | Greene et al. |
| 8,626,083 | B2 | 1/2014 | Greene et al. |
| 8,867,572 | B1 * | 10/2014 | Zhan ............... H04W 16/26 370/497 |
| RE45,273 | E | 12/2014 | Robinett |
| 2005/0227631 | A1 | 10/2005 | Robinett |
| 2005/0286448 | A1 * | 12/2005 | Proctor ............ H04B 7/15507 370/279 |
| 2006/0135083 | A1 | 6/2006 | Leinonen et al. |
| 2006/0135195 | A1 | 6/2006 | Leinonen et al. |
| 2007/0082622 | A1 | 4/2007 | Leinonen et al. |
| 2012/0295554 | A1 | 11/2012 | Greene et al. |
| 2012/0295555 | A1 | 11/2012 | Greene et al. |
| 2013/0154761 | A1 * | 6/2013 | Ilkov ................ H03H 7/465 333/101 |
| 2014/0049434 | A1 | 2/2014 | Greene et al. |
| 2014/0190841 | A1 * | 7/2014 | Nash ................. H05K 9/0045 206/37 |
| 2015/0009873 | A1 * | 1/2015 | Liu ................... H04B 1/0057 370/280 |

FOREIGN PATENT DOCUMENTS

| | | |
|---|---|---|
| AU | 2011224018 A1 | 10/2011 |
| AU | 2011224018 B2 | 11/2012 |
| CN | 201004637 | 1/2008 |
| WO | WO2012158693 | 11/2012 |

OTHER PUBLICATIONS

PCT/US2016/041407, PCT International Search Report, Oct. 26, 2016, WIPO [4 pgs.].

* cited by examiner

AUTOMATIC RF ANTENNA SWITCHING FOR AN ELECTRONIC COMMUNICATION DEVICE

RELATED APPLICATIONS

This application is related to and claims priority from U.S. Provisional patent application No. 62/190,296, titled "Automatic Antenna Switch," filed Jul. 9, 2015, the entire contents of which are hereby fully incorporated herein by reference for all purposes.

This application is related to co-owned and co-pending U.S. patent application Ser. No. 14/216,985, filed Mar. 17, 2014, titled "Sleeve With Electronic Extensions For A Cell Phone," published as US 20140199950 on Jul. 17, 2014, issued as U.S. Pat. No. 9,124,679 on Sep. 1, 2015, the entire contents of which are hereby fully incorporated herein by reference for all purposes.

U.S. Ser. No. 14/216,98 is a continuation of International Application No. PCT/US2012/056708, filed Sep. 21, 2012, which claims the benefit of the following, the entire contents of each of which are hereby fully incorporated herein by reference for all purposes: (i) U.S. patent application Ser. No. 13/238,894, filed Sep. 21, 2011, titled "Inductively coupled signal booster for a wireless communication device and in combination therewith," now U.S. Pat. No. 8,248,314, issued Aug. 21, 2012, and which claims priority from provisional patent application No. 61/385,386, filed Sep. 22, 2010; and (ii) U.S. patent application Ser. No. 13/590,053, filed Aug. 20, 2012, titled "Combination hand-held phone and radar system," now U.S. Pat. No. 8,519,885, issued Aug. 27, 2013, which is a Continuation-In-Part (CIP) of U.S. application Ser. No. 13/238,894; and (iii) U.S. patent application Ser. No. 13/591,152, filed Aug. 21, 2012, titled "Smart channel selective repeater," now U.S. Pat. No. 8,559,869, issued Oct. 15, 2013, which is a CIP of application Ser. No. 13/238,894 and Ser. No. 13/590,053; and (iv) U.S. patent application Ser. No. 13/591,171, filed Aug. 21, 2012, titled "Isolation enhancement between planar antenna elements," now U.S. Pat. No. 8,560,029, issued Oct. 15, 2013, which is a CIP of application Ser. No. 13/238,894 filed on Sep. 21, 2011, and Ser. No. 13/590,053, filed on Aug. 21, 2012, and Ser. No. 13/591,152, filed on Aug. 21, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to antennas, and, more particularly, to automatic RF switching for an electronic communications device.

BACKGROUND

Electronic communications devices such as mobile phones and the like provide communications functionality in accordance with one or more cellular telephone systems. These telephone systems may include Global System for Mobile Communications (GSM) systems, Universal Mobile Telephone System (UMTS) systems, Code Division Multiple Access (CDMA) systems, Advanced Wireless Services (AWS) systems, and others. Certain frequency bands of the radio frequency spectrum have been allocated to electronic communications devices, and these telephone systems operate at different frequencies within those allocations.

In cellular telephone communication systems a mobile device such as a mobile phone is sometimes referred to as a mobile station. Mobile devices/stations communicate in such systems via so-called base stations. Communications from a base station to a mobile device may be referred to as a downlink (DL) communication, and communication in the other direction, from a mobile device to a base station, may be referred to as an uplink communication. A particular telephone system typically has different downlink and uplink frequencies.

Each system may have a number of variations. For example, GSM includes GSM-850 (sometimes called GSM-800) and GSM-1900, both used in the United States and many other countries in the Americas. GSM-850 uses 824-849 MHz to send information from the mobile station to the base station (uplink) and 869-894 MHz for the other direction (downlink). GSM-1900 uses 1,850-1,910 MHz to send information from the mobile station to the base station (uplink) and 1,930-1,990 MHz for the other direction (downlink).

In order for an electronic communications device to operate reliably in a particular frequency band, antennas are required that may be precisely tuned to operate in the desired frequency band.

A typical electronic communications device can communicate using more than one telephone system and thus over more than one frequency. As such, a typical electronic communications device will require multiple antennas, each of which may be tuned to an appropriate frequency band. For example, Apple, Inc. sells various models of its iPhone 6, including GSM Models supporting:

UMTS/HSPA+/DC-HSDPA (850, 900, 1700/2100, 1900, 2100 MHz) and GSM/EDGE (850, 900, 1800, 1900 MHz); and CDMA Models supporting CDMA EV-DO Rev. A and Rev. B (800, 1700/2100, 1900, 2100 MHz); UMTS/HSPA+/DC-HSDPA (850, 900, 1700/2100, 1900, 2100 MHz); GSM/EDGE (850, 900, 1800, 1900 MHz). Two other models (Models A1586, A1524) support: CDMA EV-DO Rev. A and Rev. B (800, 1700/2100, 1900, 2100 MHz); UMTS/HSPA+/DC-HSDPA (850, 900, 1700/2100, 1900, 2100 MHz); TD-SCDMA 1900 (F), 2000 (A); and GSM/EDGE (850, 900, 1800, 1900 MHz).

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Glossary and Abbreviations

As used herein, unless used otherwise, the following terms or abbreviations have the following meanings:

AWS means Advanced Wireless Services;
GSM means Global System for Mobile Communications;
LNA means low-noise amplifier;
RF means radio frequency;
SP4T means Single-Pole Four-Throw (RF switch);
SP5T means Single-Pole Five-Throw (RF switch);
SP6T means Single-Pole Six-Throw (RF switch);
UMTS means Universal Mobile Telephone System; and
e-UTRA (or EUTRA) means evolved UMTS Terrestrial Radio Access.

A "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

DESCRIPTION

Figure 1:
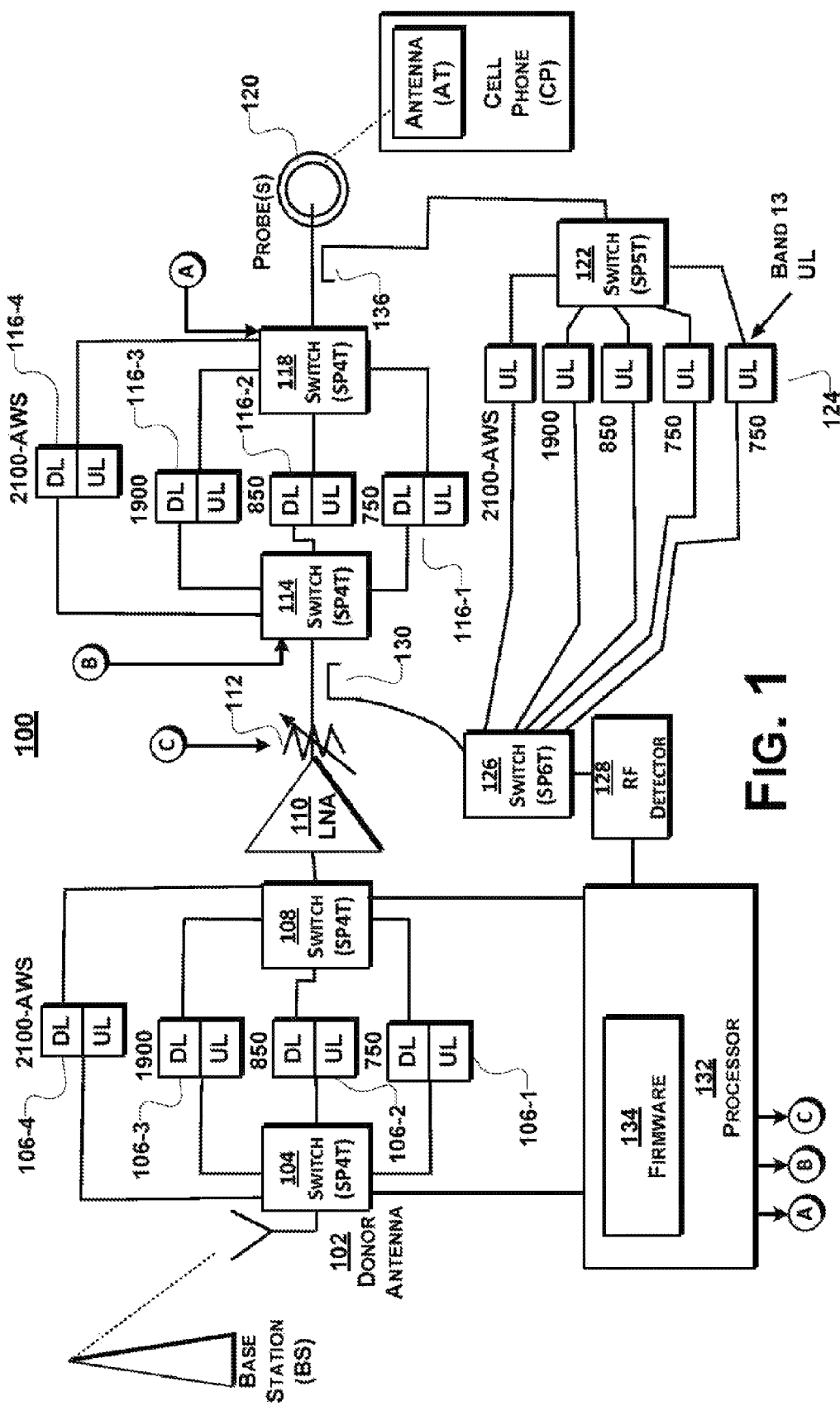
FIGS. 1 and 2 are block diagrams of RF switching systems according to exemplary embodiments hereof.

FIG. 1 is a block diagram of an RF switching system 100 according to exemplary embodiments hereof. The RF switching system 100 may be included in an assembly such as, e.g., described in U.S. Published Application No. 20140199950 (U.S. Pat. No. 9,124,679), describing, inter alia, a radio frequency (RF) coupling device that may be positioned in an enclosure of an assembly for electromagnetic coupling with at least one antenna of an electronic communication device (e.g., a mobile phone) when the communication device is in the enclosure of the assembly.

As shown in FIG. 1, a donor antenna 102 is connected to RF switch 104. RF switch 104 is preferably a single-pole N-throw (SPNT) switch, where N is the number of frequencies or frequency bands to be covered by the RF switching system 100. In a presently preferred embodiment, the system operates with four (4) frequency bands (750, 850, 1900, and 2100 MHz) and the RF switch 104 is a single-pole four-throw (SP4T) switch. For the remainder of this description the system 100 is described with reference to a four-band system. Those of ordinary skill in the art will realize and appreciate, upon reading this description, that an RF switching system 100 may be used with a different number of frequency bands, in which case the value N for the SPNT switches will differ accordingly. Output of the RF switch 104 is provided to four duplexer filters 106-1, 106-2, 106-3, and 106-4, for the 750, 850, 1900, and 2100 MHz bands, respectively. As should be understood, the number of duplexer filters corresponds to the number of frequency bands covered by the RF switching system 100. The duplexer filters 106-1, 106-2, 106-3, and 106-4 are connected to a second antenna (SP4T) switch 108.

Output of RF switch 108 is provided to amplifier 110 and the amplifier 110 is connected via a gain controller 112 to a third antenna (SP4T) switch 114. The gain controller 112 may be a step attenuator voltage control. Output from the third SP4T RF switch 114 is provided to four duplexer filters 116-1, 116-2, 116-3, and 116-4, for 750, 850, 1900, and 2100 MHz bands, respectively. The duplexer filters 116-1, 116-2, 116-3, and 116-4 are connected to a fourth SP4T RF switch 118. The fourth SP4T RF switch 118 is connected to one or more connect probes 120. The connect probe(s) 120 is/are preferably positioned in the assembly such that when a cell phone (CP) or the like is in the assembly the connect probe(s) 120 is/are substantially adjacent at least one antenna (AT) of the cell phone. The connect probe(s) 120 thereby connect the donor antenna 102 with the cell phone antenna (AT).

As should be appreciated, a mobile device such as a cell phone may have more than one antenna, and the antenna system 100 may, correspondingly, include more than one connect probe 120. Those of ordinary skill in the art will realize and appreciate, upon reading this description, that the position of the connect probes 120 in the assembly will depend on the position(s) of the antenna(s) of the mobile device. The connect probe(s) 120 may be formed, e.g., as described in U.S. Patent Publication 20140199950 and/or U.S. Pat. No. 8,248,314.

The antenna system 100 further includes a fifth RF switch 122 (in the exemplary embodiment of FIG. 1 the fifth RF switch comprises a single-pole five-throw (SP5T) antenna) switch connected to the probe(s) 120. The fifth RF switch 122 is connected to uplink filters (collectively denoted 124 in the drawing). There is preferably at least one uplink filter for each downlink frequency band being handled by the system 100. In the exemplary embodiment of FIG. 1 there are five uplink filters corresponding, respectively, to five uplink bands 2100 MHz, 1900 MHz, 850 MHz, 750 MHz, and 750 MHz in band 13.

A coupler 130 is electrically connected to the line between the amplifier 110 and the switch 114.

Output from the uplink filters 124 and output from the coupler 130 are provided to a sixth RF switch, a single-pole six-throw (SP6T) RF switch 126. In the exemplary embodiment in FIG. 1, there are five (5) outputs from the fifth RF switch 122, and so, with the output from the coupler 130, the sixth RF switch requires six (6) inputs and is preferably a single-pole six-throw (SP6T) RF switch.

An RF detector 128 is connected the sixth RF switch 126, and output of the RF detector 128 is provided to microprocessor 132. The processor 132 may comprise software (e.g., firmware) 134 to control operation thereof and of the antenna system 100. In particular, the processor 132 (e.g., using firmware 134) may control each of the RF switches 104, 108, 114, and 118 as well as the gain controller 112.

In operation of the antenna system 100, the system is preferably connected to a cell phone or the like (i.e., antenna probe(s) 120 of the system 100 are coupled with one or more antennae (AT) of a cell phone (CP)). The RF switches 104, 108, 114, and 118 cycle or switch, in synch, through the downlink frequencies that the antenna system 100 is configured to handle. In the exemplary embodiment of FIG. 1, the downlink frequency bands are 750, 850, 1900, and 2100 MHz bands, and so the four RF switches 104, 108, 114, and 118 cycle, in synch, through those frequency bands. By the term "cycle, in synch" we mean that each of the four RF switches 104, 108, 114, and 118 is tuned to the same frequency band at substantially the same time.

In operation, the cell phone (CP) connected to the antenna will use its own mechanisms to select an appropriate frequency band from a base station (BS) within which to operate. The base station may tell the phone a frequency to use. Typically the cell phone (CP) will cycle through the various bands to find the one with the strongest signal. The phone then uses a pilot signal to notify the base station (BS) of the frequency it (the phone) has selected.

Switches 122 and 126 continuously cycle through each uplink band to allow signal to the RF detector at a rate which is fast enough to detect a pilot signal. When the phone selects a frequency band and sends a pilot signal back to the base station (BS) using the selected frequency (FS) that pilot signal is passed (via coupler 136) to RF switch 122 and through the appropriate uplink filter 124 to RF switch 126. When a signal is sent, the RF detector 128 will detect the signal and its frequency and provide that information to the processor 132. The processor 132 (using firmware 134) then signals each of the four RF switches 104, 108, 114, and 118 to lock on to the selected frequency (FS).

For example, suppose that the antenna system 100 is connected to a cell phone (CP) and that the phone receives a signal from a base station (BS) using the 850 MHz frequency band. If the phone selects that 850 MHz frequency band then the phone will send a signal back to the base station. The signal from the phone to the base station will be picked up by the coupler 136 and passed through the RF switch 122 and through the appropriate uplink filter (in this case 850 MHz) to the switch 126. The RF detector will detect the 850 MHz signal and so inform the processor 132. This will cause the processor to signal each of the four RF switches 104, 108, 114, and 118 to lock on to the selected frequency (850 MHz).

The amplifier 110 may amplify the downlink signal (from the base station to the phone, via the probe(s)). Since the output from the amplifier 110 is an input to the switch 126 (via coupler 130), the RF detector will detect the amplified signal from the amplifier 110. Based on this detection, the processor may control the gain controller 112 to adjust (reduce or increase) the power of that signal. It should be appreciated that when the phone has signaled a selected frequency (FS) then the frequency of the signal picked up by the coupler will be (or become) that selected frequency (since the switches 104 and 108 will be locked on to that frequency. In order to protect the phone and to prevent oscillation and feedback, the uplink signal may thus be monitored using RF detector 128 to control gain controller 112.

The exemplary embodiment of FIG. 1 operates with four (4) frequency bands (e.g., 750, 850, 1900, and 2100 MHz). As noted, however, implementations may be used and operated with a different number of frequency bands (e.g., with fewer or more frequency bands).

In the exemplary embodiment of FIG. 1, the RF switches 104, 108, 114, and 118 cycle, in synch, through the supported frequency bands, and then, based on a pilot signal from the phone, the RF switches lock onto the appropriate/selected frequency. In other embodiments the RF switches may be in an idle mode (using little or no power) until the attached phone's pilot signal causes them to be locked on to a particular frequency.

As described, the uplink signal from the connected mobile device (e.g., cell phone CP) determines which frequency band to boost. The uplink signal is monitored, e.g., every second, to detect the frequency that has been chosen by the phone (the phone preferably picks the strongest signal it receives on the downlink).

When not in use for a call, the system goes into a standby mode in which the system goes into a low current mode.

Figure 2:
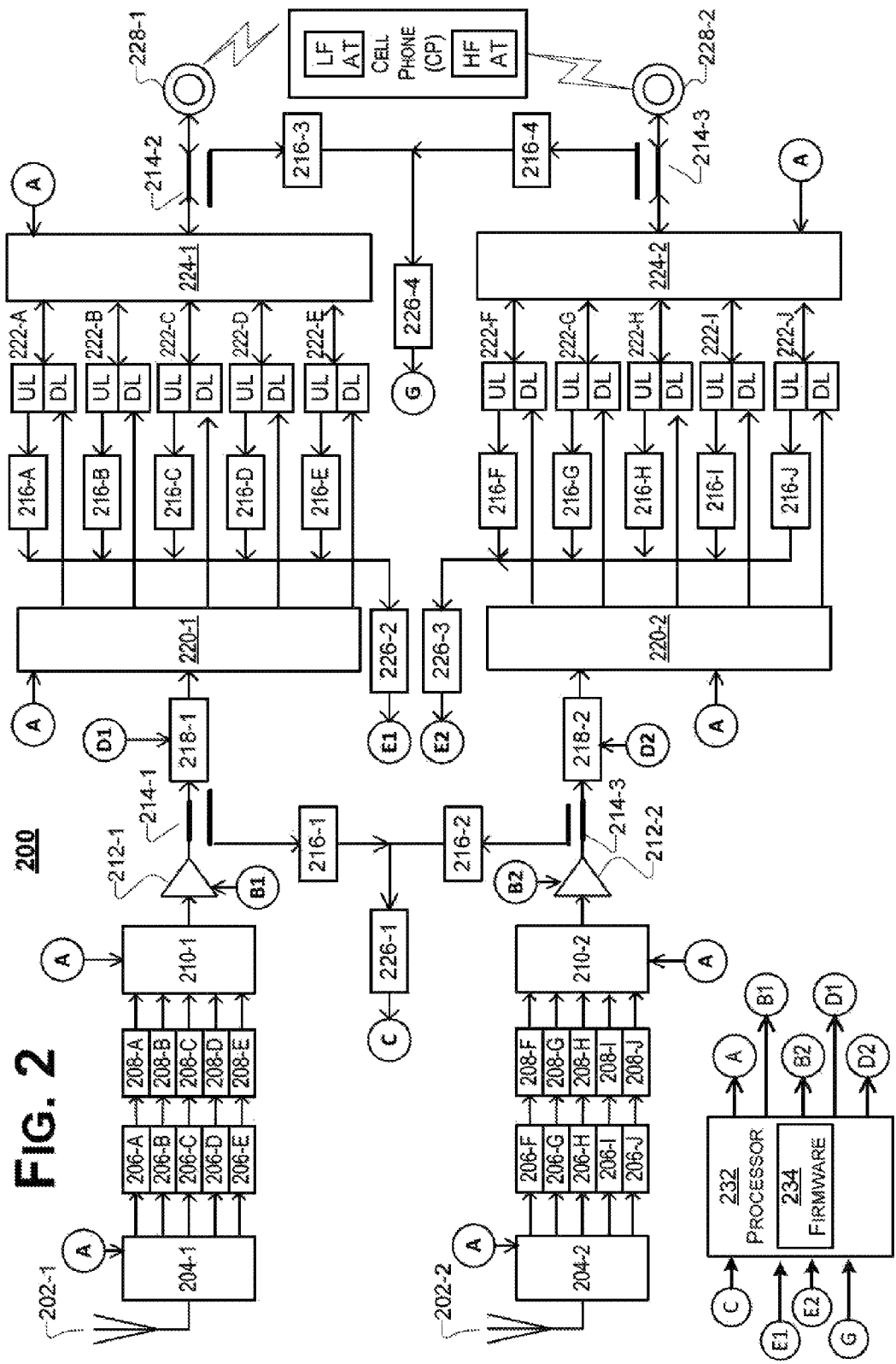

FIG. 2 is a block diagram of an RF switching system 200 according to exemplary embodiments hereof. The RF switching system 200 of FIG. 2 supports ten (10) frequency bands. In this exemplary embodiment the frequency bands are logically grouped into two wide bands, low frequency (LF) bands (e.g., under 1 GHz) and high-frequency (HF) bands (e.g., over 1 GHz). As will be appreciated, such a system supports ten e-UTRA bands (e.g., e-UTRA bands 1-5, 7, 8, 13, 17, 20, respectively 2100, 1900, 1800, 1700, 850, 2600, 900, 700, 700, 800 MHz). In the case of these ten e-UTRA bands, the five low-frequency bands (ordered from lowest to highest frequency) are 13 (700 MHz, uplink 777-787 MHz, downlink 746-756 MHz), 17 (700 MHz, uplink 704-716 MHz, downlink 734-746 MHz), 20 (800 MHz), 5 (850 MHz), and 8 (900 MHz), and the five high-frequency bands (also ordered from lowest to highest frequency) are 4 (1,700 MHz), 3 (1,800 MHz), 2 (1,900 MHz), 1 (2,100 MHz), and 7 (2,600 MHz).

Those of ordinary skill in the art will realize and appreciate, upon reading this description, that a different boundary (other than 1 GHz) may be selected to group LF and HF bands.

The RF switching system 200 includes two donor antennae, a LF band donor antenna 202-1 and HF band donor antenna 202-2.

The LF band donor antenna 202-1 is connected to an RF switch 204-1. RF switch 204-1 is preferably a single-pole N-throw (SPNT) switch, where N is the number of frequencies or frequency bands to be covered by the LF bands of RF switching system 200. In the exemplary embodiment of the RF switching system 200 shown in FIG. 2, there are five LF bands and RF switch 204-1 is single-pole five-throw (SP5T) RF switch. For the remainder of this description the system 200 is described with reference to a five-LF-band system (and a five-HF-band system).

Output of the RF switch 204-1 is provided to five antenna matching circuits 206-A, 206-B, 206-C, 206-D, and 206-E, e.g., for the 13 (700 MHz), 17 (700 MHz), 20 (800 MHz), 5 (850 MHz), and 8 (900 MHz) bands, respectively. The five antenna matching circuits 206-A, 206-B, 206-C, 206-D, and 206-E are each connected to a second SP5T switch 210-1 via a corresponding bandpass filter 208-A, 208-B, 208-C, 208-D, and 208-E.

Antenna matching circuits 206-A, 206-B, 206-C, 206-D, and 206-E match the antenna(s) with a corresponding selected bandpass filter.

As should be understood, the number of bandpass filters connected to the RF switch 204-1 corresponds to the number of LF frequency bands covered by the RF switching system 200.

Output of RF switch 210-1 is provided to amplifier 212-1, and the amplifier 212-1 is connected via directional coupler 214-1 to gain controller (e.g., step attenuator voltage control) 218-1 which is connected to a third (SP5T) RF switch 220-1. Output from the third SP5T RF switch 220-1 is provided to five duplexer filters 222-A, 222-B, 222-C, 222-D, and 222-E, for the LF bands (e.g., the 13 (700 MHz), 17 (700 MHz), 20 (800 MHz), 5 (850 MHz), and 8 (900 MHz) bands, respectively). The duplexer filters 222-A, 222-B, 222-C, 222-D, and 222-E are connected to a fourth SP5T RF switch 224-1.

Each duplexer filter 222-A, 222-B, 222-C, 222-D, and 222-E is also connected to a corresponding Schottky diode detector 216-A, 216-B, 216-C, 216-D, and 216-E, and the Schottky diode detectors are connected to a voltage comparator 226-2. The output signal of voltage comparator 226-2 (denoted E1) indicates mobile activity in an LF band, and is provided to microprocessor 232.

The fourth SP5T RF switch 224-1 is connected to one or more LF connect probes (or probe antennas) 228-1.

The LF connect probe(s) 228-1 is/are preferably positioned in the assembly such that when a cell phone (CP) or the like is in the assembly the connect probe(s) 228-1 is/are substantially adjacent at least one LF antenna (LF AT) of the cell phone. The connect probe(s) 228-1 thereby connect the LF donor antenna 204-1 with the cell phone's native LF antenna (LF AT). Note that the cell phone may use the same antenna structure for LF and HF bands, or it may have separate LF and HF native antennae.

The directional coupler 214-1 (electrically connected to the line between the amplifier 212-1 and gain controller 218-1) is connected to a Schottky diode detector 216-1 which connects to voltage comparator 226-1. As explained below, a comparable connection from the HF components is also provided to the voltage comparator 226-1 (via Schottky diode detector 216-2), and the output signal on voltage comparator 226-1 (denoted C), indicative of an oscillation alarm, is provided as input to the microprocessor 232.

Similar to the LF components, the HF band donor antenna 202-2 is connected to an RF switch 204-2, preferably a single-pole N-throw (SPNT) switch, where N is the number of frequencies or frequency bands to be covered by the LF bands of HF switching system 200. In the exemplary embodiment of the RF switching system 200 shown in FIG. 2, there are five HF bands and RF switch 204-2 is single-pole five-throw (SP5T) RF switch. Those of ordinary skill in the art will realize and appreciate, upon reading this description, that an RF switching system 200 may be used with a different number of LF and HF frequency bands, in which case the value N for the SPNT switches on the LF and HF paths will differ accordingly. It should also be appreciated that the system 200 may have a different number of LF and HF bands.

Output of the RF switch 204-2 is provided to antenna matching circuits 206-F, 206-G, 206-H, 206-I, and 206-J, e.g., for the HF bands (e.g., the 4 (1,700 MHz), 3 (1,800 MHz), 2 (1,900 MHz), 1 (2,100 MHz), and 7 (2,600 MHz) bands, respectively). As should be understood, the number of antenna matching circuits connected to the HF RF switch 204-2 corresponds to the number of HF frequency bands covered by the RF switching system 200. The five antenna matching circuits 206-F, 206-G, 206-H, 206-I, and 206-J are each connected to a second SP5T switch 210-2 via a corresponding bandpass filter 208-F, 208-G, 208-H, 208-I, and 208-J.

Output of RF switch 210-2 is provided to amplifier 212-2, and the amplifier 212-2 is connected via directional coupler 214-3 to gain controller (e.g., step attenuator voltage control) 218-2 which is connected to RF (SP5T) switch 220-2. Output from the SP5T RF switch 220-2 is provided to five duplexer filters 222-F, 222-G, 222-H, 222-I, and 222-J, for the five HF bands (e.g., the 4 (1,700 MHz), 3 (1,800 MHz), 2 (1,900 MHz), 1 (2,100 MHz), and 7 (2,600 MHz) bands, respectively). The duplexer filters 222-F, 222-G, 222-H, 222-I, and 222-J are connected to SP5T RF switch 224-2.

Each duplexer filter 222-F, 222-G, 222-H, 222-I, and 222-J is also connected to a corresponding Schottky diode detector 216-F, 216-G, 216-H, 216-I, and 216-J, and the Schottky diode detectors are connected to a voltage comparator 226-3. The output signal of voltage comparator 226-3 (denoted E2) indicates mobile activity in an HF band, and is provided to microprocessor 232.

The SP5T RF switch 224-2 is connected to one or more HF connect probes (or probe antennas) 228-2.

The HF connect probe(s) 224-2 is/are preferably positioned in the assembly such that when a cell phone (CP) or the like is in the assembly the connect probe(s) 228-2 is/are substantially adjacent at least one HF antenna (AT) of the cell phone. The connect probe(s) 228-2 thereby connect the HF donor antenna 204-2 with the cell phone's native HF antenna (HF AT). As noted, a cell phone may use the same antenna structure for LF and HF bands, or it may have separate LF and HF native antennae.

The LF and HF connect probes/probe antennas 228-1 and 228-2 may be formed, e.g., as described in U.S. Patent Publication 20140199950 and/or U.S. Pat. No. 8,248,314.

The directional coupler 214-3, electrically connected to the line between the amplifier 212-2 and gain controller 218-2, is connected to a Schottky diode detector 216-2 which connects to voltage comparator 226-1. As explained above, a comparable connection from the LF components is also provided to the voltage comparator 226-1 (via Schottky diode detector 216-1), and the output signal of voltage comparator 226-1 (denoted C), indicative of an oscillation alarm, is provided as input to the microprocessor 232.

A directional coupler 214-2 is electrically connected to the line between the RF switch 224-1 and the LF connect probe(s) 228-1. Similarly, a directional coupler 214-3 is electrically connected to the line between the RF switch 224-2 and the HF connect probe(s) 228-2. The directional coupler 214-2 is connected to Schottky diode detector 216-3 which connects to voltage comparator 226-4. Similarly, directional coupler 214-3 is connected to Schottky diode detector 216-4 which connects to voltage comparator 226-4. The output signal of voltage comparator 226-4 (denoted G) is indicative of mobile activity (instant), and is provided to the microprocessor 232.

The amplifier 212-1 is controlled by signal(s) (denote B1) from the microprocessor 232. The amplifier 212-2 is controlled by signal(s) (denote B2) from the microprocessor 232.

The gain controller 218-1 is controlled by signal(s) (denote D1) from the microprocessor 232. The gain controller 218-2 is controlled by signal(s) (denote D2) from the microprocessor 232.

The switches 204-1, 204-2, 210-1, 210-2, 220-1, 220-2, 224-1, and 224-2 are controlled by signal(s) (denoted A) from the microprocessor 232.

In an exemplary implementation, the microprocessor 232 is an Atmel picoPower 8-bit AVR RISC-based microcontroller (ATtiny88) with 8 KB Flash Memory (4kWords) and an internal 4 MHz RC oscillator. In this implementation, six pins are used for the signal(s) "A" to control the switches. The microprocessor preferably runs firmware 234 to support operation of the system 200.

In operation of RF switching system 200, a connected cell phone's uplink (UL) activity is used for actual downlink (DL) frequency band identification and filter setup. A cell phone is connected to the RF switching system 200 if/when one or both of the probe antennas 128-1, 128-2 are operatively connected to the cellphone's native antennas (e.g., using near-field coupling). In preferred implementations, the antenna systems 100, 200 are incorporated in a case for the cellphone, where the case holds the probe antennas 128-1, 128-2 substantially adjacent the cellphone's native antennas.

When the connected cell phone (CP) uses its own mechanisms to detect and select an appropriate frequency band from a base station (BS, not shown in FIG. 2) within which to operate. As previously noted, the base station may tell the phone a frequency to use. Typically the cell phone (CP) will cycle through the various bands to find the one with the strongest signal. The phone then uses a pilot signal to notify the base station (BS) of the frequency it (the phone) has selected.

The phone's pilot signal causes the system 200 to transition from a sleep or standby mode (in which the circuitry is mostly powered down) to an operative mode. The uplink signal from the phone corresponds to the downlink signal to be amplified.

With reference again to the RF switching system 200 in FIG. 2, when the phone emits a pilot signal in a particular frequency (SF), the output signal of voltage comparator 226-4, indicative of mobile activity, will be provided to the processor 232, initiating further processing by firmware 234. The phone's selected frequency (SF) will either be LF or HF. For the sake of this description, assume that F is LF. The phone's pilot signal will thereby cause the output signal of voltage comparator 226-2 (E1, provided to processor 232) to indicate mobile activity in an LF band.

Once the processor determines which frequency the phone has selected, the switches 204-1, 204-2, 210-1, 210-2, 220-1, 220-2, 224-1, and 224-2 are controlled by signal(s) (A) from the microprocessor 232 to lock onto that signal and to turn on only the required components in the path for that selected frequency. Thus, e.g., if the phone picks an 850 MHz frequency, then microprocessor 232 signals switches 204-1, 210-1, 220-1, and 224-1 to lock onto the 850 MHz band. Downlink signals then pass through switch 204-1, antenna matching circuitry 206-D, band filter 208-D, switch 210-1, amplifier 212-1, gain controller 218-1, switch 220-1, duplexer filter 222-D, switch 224-1, and probe 228-1, to the cell phone's native LF antenna.

The amplifier 212-1 is controlled by the microprocessor 232 using signal B1, and the gain controller 218-1 is controlled by signal(s) (D1) from the microprocessor 232. If the system detects oscillation, the signal (C) sent to the microprocessor 232 will cause the microprocessor 232 to instruct the attenuator 218-1 (via signal D1) to reduce the gain until the oscillation stops.

Similar operation occurs on the HF component if the phone emits a HF pilot signal.

Those of ordinary skill in the art will realize and appreciate, upon reading this description, that the low-power operation of the system 200 can be used even if the circuitry is not split into low and high frequency components.

While the exemplary embodiment of FIG. 2 shows a system supporting ten frequency bands (five low and five high), those of ordinary skill in the art will realize and appreciate, upon reading this description, that different numbers of frequency bands may be supported. Furthermore, there is no requirement that the number of low frequency bands (five in the embodiments shown) be the same as the number of high frequency bands, and different numbers of low and high frequency bands are contemplated herein. There is also no requirement that the circuitry for the low (or high) frequency bands support more than one frequency band. Thus, in general, the system may support L low-frequency bands (L≥0) and H high-frequency bands (H≥0). In the exemplary embodiments shown in FIG. 2, L=H=5.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A device comprising:
   (a) a plurality of radio frequency (RF) switches, each of said RF switches operable with a plurality of frequency bands;
   (b) at least one RF coupling device; and
   (c) a processor programmed to selectively control operation of said plurality of RF switches based on an uplink signal from an electronic communication device electromagnetically coupled with said at least one RF coupling device,
   wherein said plurality of radio frequency (RF) switches comprise:
   (i) one or more low RF band (LRFB) switches operable in one or more low frequency bands under a particular frequency (F), and
   (ii) one or more high RF band (HRFB) switches operable in one or more high frequency bands at or over said particular frequency (F), and
   wherein said at least one RF coupling device comprises
   (iii) at least one LRFB coupling device corresponding to said one or more low frequency bands under said particular frequency (F), and
   (iv) at least one HRFB coupling device corresponding to said one or more high frequency bands at or over said particular frequency (F), and
   wherein the one or more LRFB switches comprise a first LRFB switch and a second LRFB switch, and wherein the one or more HRFB switches comprise a first HRFB switch and a second HRFB switch, the device further comprising:
   (a) a first low-noise amplifier (LNA) connected to said second LRFB switch, said first LNA for amplifying LRFB signals output by said second LRFB switch, and
   (b) a second LNA connected to said second HRFB switch, said second LNA for amplifying HRFB signals output by said second HRFB switch.

2. The device of claim 1 wherein said processor is programmed to selectively control operation of said plurality of RF switches by causing each of said plurality of RF switches to lock on a particular frequency band of said plurality of frequency bands.

3. The device of claim 2 wherein said particular frequency band corresponds to a frequency of the uplink signal from the electronic communication device.

4. The device of claim 1 wherein said processor is programmed to detect said uplink signal from said electronic communication device electromagnetically coupled with said RF coupling device.

5. The device of claim 1 wherein the plurality of radio frequency (RF) switches comprises a first RF switch, and a second RF switch, the device further comprising:
an amplifier connected to the second RF switch for amplifying an RF signal output by said second RF switch.

6. The device of claim 5 further comprising:
a gain controller connected to an output of the amplifier, wherein said processor is further programmed to control said gain controller based on said RF signal output by said second RF switch.

7. The device of claim 6 wherein said plurality of radio frequency (RF) switches further comprise a third RF switch connected to an output of said gain controller.

8. The device of claim 7 wherein said plurality of radio frequency (RF) switches further comprise a fourth RF switch connected to said RF coupling device.

9. The device of claim 1 wherein the device is in an assembly having an enclosure for holding said electronic communication device.

10. The device of claim 9 wherein, when said electronic communication device is in said assembly an antenna of said electronic communication device is electromagnetic coupled with said RF coupling device.

11. The device of claim 9, wherein the assembly comprises a protective case for the electronic communication device.

12. The device of claim 1 wherein, prior to being locked onto said particular frequency band, said plurality of RF switches continuously switch through said plurality of frequency bands in synch.

13. The device of claim 1 wherein said plurality of RF switches comprise a plurality of Single-Pole N-Throw (SPNT) switches, where N is the number of frequency bands in said plurality of frequency bands.

14. The device of claim 13, where the plurality of frequency bands comprise four frequency bands and wherein said plurality of RF switches consists of four Single-Pole Four-Throw (SP4T) switches.

15. The device of claim 1 wherein said plurality of frequency bands comprise one or more of: 700, 850, 900, 1800, 1900, and 2100 MHz.

16. The device of claim 1 wherein said processor is programmed to selectively control operation of said of LRFB switches and said HRFB switches by causing at least some of said switches to lock on a particular frequency band.

17. The device of claim 16 wherein said particular frequency band corresponds to a frequency of the uplink signal from the electronic communication device.

18. The device of claim 1 wherein said first LNA selectively amplifies LRFB signals output by said second LRFB switch, under control of said processor.

19. The device of claim 1 wherein said second LNA selectively amplifies HRFB signals output by said second HRFB switch, under control of said processor.

20. The device of claim 1 wherein the one or more LRFB switches further comprise a third LRFB switch connected to an output of said first LNA, and wherein the one or more HRFB switches further comprise a third HRFB switch connected to an output of said second LNA.

21. The device of claim 20 further comprising one or more LRFB duplexers connected to said third LRFB switch; and one or more HRFB duplexers connected to said third HRFB switch.

22. The device of claim 21 further comprising
one or more LRFB detectors connected to said LRFB duplexers; and
one or more HRFB detectors connected to said HRFB duplexers.

23. The device of claim 21 wherein
the one or more LRFB switches comprise a fourth LRFB switch connected to said LRFB duplexers; and
the one or more HRFB switches comprise a fourth HRFB switch connected to said HRFB duplexers.

24. The device of claim 23 wherein said one or more LRFB detectors and said one or more HRFB detectors detect an uplink activity of the electronic communication device.

25. The device of claim 1 wherein the particular frequency (F) is 1 GHz.

26. The device of claim 1 wherein
the one or more low RF frequency bands comprise at least two frequency bands under said particular frequency (F).

27. The device of claim 26 wherein
the one or more high RF frequency bands comprise at least two frequency bands at or over said particular frequency (F).

28. The device of claim 27 wherein
the one or more low RF frequency bands comprise five RF frequency bands under said particular frequency (F); and
the one or more high RF frequency bands comprise five RF frequency bands at or over said particular frequency (F).

29. The device of claim 1 wherein
the one or more low RF frequency bands comprise bands selected from: 700 MHz, 800 MHz, 850 MHz, and 900 MHz; and
the one or more high RF frequency bands comprise one or more bands selected from: 1,700 MHz, 1,800 MHz, 1,900 MHz, 2,100 MHz, and 2,600 MHz.

* * * * *